United States Patent [19]
Johannesson

[11] Patent Number: 6,161,580
[45] Date of Patent: Dec. 19, 2000

[54] PULSATOR

[75] Inventor: Leif Börje Johannesson, Tumba, Sweden

[73] Assignee: Alfa Laval Agri AB, Tumba, Sweden

[21] Appl. No.: 09/424,746

[22] PCT Filed: May 22, 1998

[86] PCT No.: PCT/SE98/00972

§ 371 Date: Nov. 29, 1999

§ 102(e) Date: Nov. 29, 1999

[87] PCT Pub. No.: WO98/53670

PCT Pub. Date: Dec. 3, 1998

[30] Foreign Application Priority Data

May 29, 1997 [SE] Sweden .................................. 9702029

[51] Int. Cl.[7] ..................................................... A01J 5/04
[52] U.S. Cl. ..................... 137/624.14; 137/103; 137/105; 119/14.41
[58] Field of Search ......................... 137/624.13, 624.14, 137/103, 105, 488, 489, 489.5, 104; 119/14.41, 14.44

[56] References Cited

U.S. PATENT DOCUMENTS

| | | | |
|---|---|---|---|
| 4,643,132 | 2/1987 | Icking et al. .................... | 137/624.13 X |
| 5,010,844 | 4/1991 | Tackeuchi et al. .............. | 119/14.41 X |
| 5,167,200 | 12/1992 | Icking ................................. | 137/103 X |
| 5,207,177 | 5/1993 | Lidman ............................. | 119/14.41 X |

FOREIGN PATENT DOCUMENTS

| | | |
|---|---|---|
| 0009282 | 9/1979 | European Pat. Off. . |
| 22014828 | 10/1973 | France . |
| 344531 | 4/1972 | Sweden . |
| 467183 | 6/1992 | Sweden . |

*Primary Examiner*—Kevin Lee
*Attorney, Agent, or Firm*—Hovey, Williams, Timmons & Collins

[57] ABSTRACT

A pulsator comprises a first circuit having a first outlet (2) and a second outlet (3), connected alternatively to a first pressure level and a second pressure level, respectively. Furthermore, the pulsator comprises a second circuit, which comprises a first inlet (17a, 17b) connected to the first pressure level, a second inlet (18a, 18b) connected to the second pressure level, and valve members (19a, 19b) for its adjustment by a short connection of a control inlet (26a, 26b) of the valve members to the second pressure level between a first stable position at which the first inlet is connected to a first chamber (10) at the same time as the second inlet is connected to a second chamber (11) or a second stable position at which the first inlet (17b) is connected to the second chamber (11) at the same time as the second inlet (18a) is connected to the first chamber (10).

20 Claims, 1 Drawing Sheet

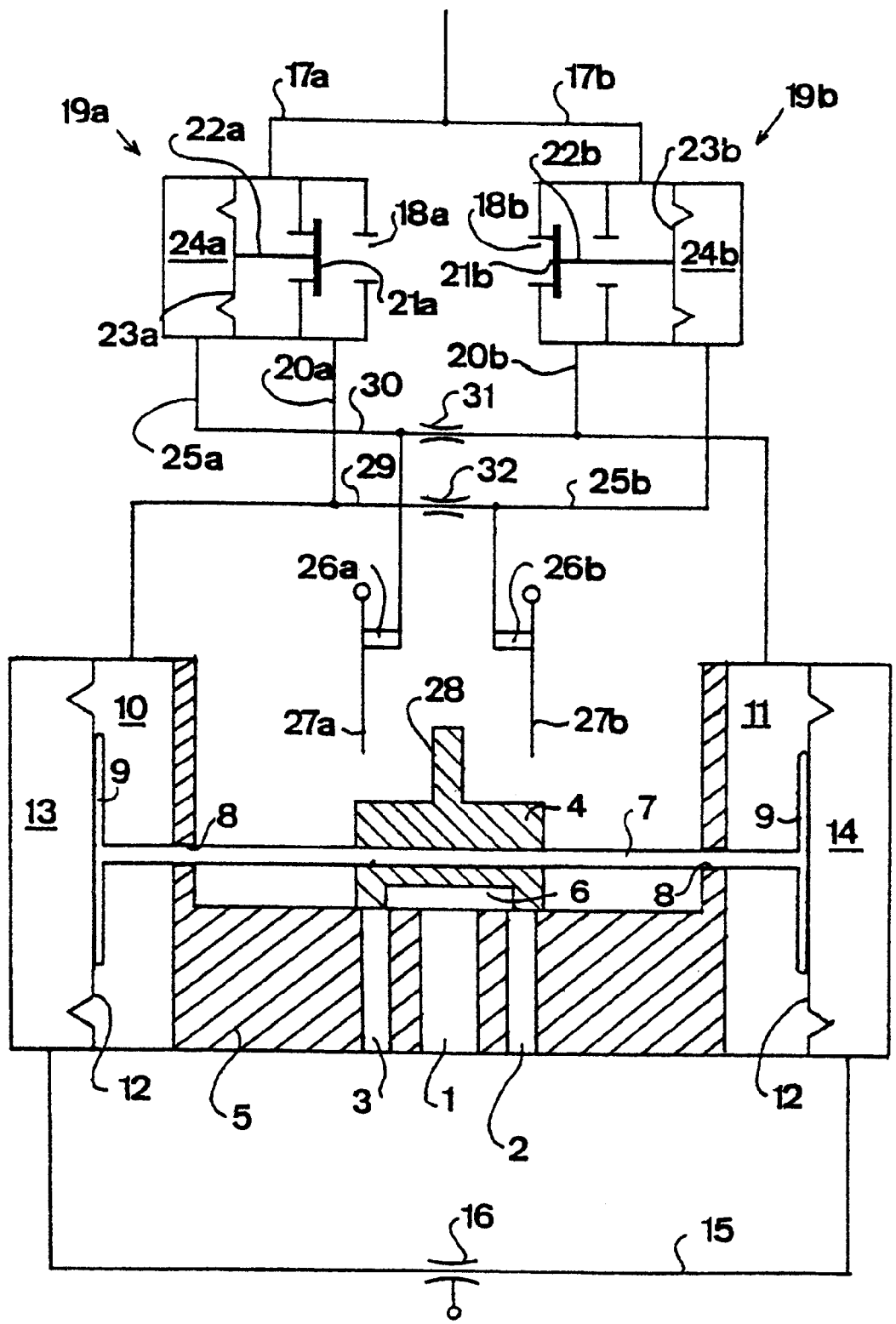

PULSATOR

BACKGROUND OF THE INVENTION

1. Field of the Invention

The present invention refers to a pulsator according to the preamble of claim 1.

Today, such pulsators are used in milking machines for alternate pulsation of two pairs of teatcups between a suction phase, i.e. usually a sub-atmospheric pressure, and a pressure phase, i.e. usually atmospheric pressure. During alternate pulsation, the pulsation cycle, i.e. the sum of the suction time and the pressure time, for one of the pairs of teatcups is displaced in relation to the pulsation cycle for the other pair. This means that one of the teatcup pairs is essentially in the suction phase and the other of the pairs essentially in the pressure phase. It is important that the suction phases of both the teatcup pairs have the same duration in order to avoid an uneven milking of the teats. This difference between the duration of the suction phases which is provided by a pulsator is called limping.

2. Description of the Prior Art

SE-B-344 531 discloses a pulsator of the type initially defined and intended for a milking machine. The adjustment of the second circuit is performed by this known pulsator by means of a change-over mechanism, comprising a change-over arm provided on the valve element, a change-over spring and a valve slide. The change-over arm is pivotably attached to a housing of the pulsator and is forcibly pivoted back and forth about a pivot point by means of the movements back and forth of the valve element. The valve slide has two curved surfaces which are intended to slide in turn against a corresponding curved surface of the change-over arm. These surfaces co-operate for controlling the time moments for the change-over of the valve slide from one end position to another. One problem with this known pulsator is that the change-over mechanism comprises many moveable, mechanical construction parts which have to be manufactured with high precision, which makes the production of the pulsator expensive. Due to the many parts and the friction which arises between these parts, there is also a slowness of the change-over mechanism, which results in a mechanical work to be overcome. In addition, the level of the slowness is difficult to determine and is changed with the wear of the parts of the change-over mechanism. Moreover, due to the wear, regular service of the pulsator is required in order to enable the maintenance of a desired pulsation accuracy. Furthermore, the limping of this known pulsator is at least not easily adjustable.

SUMMARY OF THE INVENTION

The object of the present invention is to provide a self-controlled pulsator by which the problems mentioned above may be remedied. In particular, it is aimed at a pulsator of a simple and reliable construction having few moveable parts.

This object is obtained by the pulsator initially defined and characterized in that the second circuit comprises valve members which are arranged to enable change-over of the second circuit from one of said stable positions to the other of these positions by means of a connection of short duration of a control inlet of said valve members to the second pressure source. By such valve members controlled by a short connection, or a pulse-shaped connection, the bistable second circuit may be operated by a minimum of moveable parts. In this manner, it is possible to reduce the slowness which did arise during the change-over between the two stable positions according to the technique previously known.

According to an embodiment of the invention, said control inlet comprises a closing member, which at a rest position closes the control inlet, and the valve element comprises a portion arranged to influence the closing member in such a manner that the control inlet is opened at said change-over. In such a manner, the movement of the valve element of the first circuit may be utilized to provide a short connection or a pulse-shaped connection. The closing member may be designed in a plurality of different manners, for instance as a membrane biased against a seat and openable by means of an extremely small force from the portion of the valve element. The limping of such a pulsator may easily be adjusted by a displacement of the portion of the valve element in relation to the first and second chambers.

According to a further embodiment of the invention, said valve members of the second circuit comprise a first and a second relay valve, the first relay valve being connected to the first chamber via a first outlet conduit and the second relay valve being connected to the second chamber via a second outlet conduit. Thereby, each relay valve may comprise a two-way valve which at a first position closes a passage between the first inlet and the respective outlet conduit at the same time as a passage between the second inlet and the respective outlet conduit is opened, and at a second position opens a passage between the first inlet and the respective outlet conduit at the same time as a passage between the second inlet and the respective outlet conduit is opened. Each relay valve may comprise a control chamber which is arranged in such a manner that the pressure level therein determines which of said first and second positions said two-way valve is to take.

According to a further embodiment of the invention, a first control conduit connects a first of said control inlets to the control chamber of the first relay valve and a second control conduit connects a second of said control inlets to the control chamber of the second relay valve. Each control chamber may comprise a membrane to which said two-way valve is connected. In such a manner, it is ensured that the relay valve associated with the actual control inlet is adjusted from the first to the second position. Furthermore, the first outlet conduit may be connected to the second control conduit via a first passage and the second outlet conduit may be connected to the first control conduit via a second passage. In such a manner, it is ensured that also the second relay valve is adjusted from the second to the first position. Advantageously, each of said passages comprises a throttling, which delays the pulse to the second relay valve and thereby ensures the change-over of the first relay valve.

According to a further embodiment of the invention, the valve element is provided on a displaceable element which at its ends is arranged to be influenced by a first and a second membrane forming a limiting wall of the first and second chambers, respectively. Thereby, the first and the second membrane may also adjoin a third chamber and a fourth chamber, respectively, which are arranged to dampen the movements of the displaceable valve element. Advantageously, the third and the fourth chambers are arranged to enclose a damping medium and are connected to each other via a connection conduit which may comprise a controllable throttling for controlling the dampening of the pulsator.

BRIEF DESCRIPTION OF THE DRAWINGS

The present invention is now to be explained by means of an embodiment, disclosed by way of example, and with reference to the drawing attached which discloses a schematical view of a pulsator according to the present invention.

DETAILED DESCRIPTION OF DIFFERENT EMBODIMENTS

The figure discloses a pulsator for a milking machine and in particular for alternate pulsating of a pulsation chamber of two pairs of teatcups (not disclosed). The pulsator comprises a first circuit having an inlet 1, which is intended to be connected to a vacuum pump (not disclosed) of the milking machine, and two outlets 2, 3 which each is intended to be connected to one of said pair of teatcups. The outlets 2 and 3 are arranged to be connected alternately to the inlet 1 by means of a valve element 4 which is displaceable by a movement back and forth over the orifices of the inlet 1 and the outlets 2, 3 in a housing 5 of the pulsator. The valve element 4 comprises a recess 6 facing said orifices and forming, depending on the position of the valve element 4, a passage between essentially the inlet 1 and the outlet 2 or the inlet 1 and the outlet 3. The valve element 4 is provided on an elongated element in the shape of a rod 7 which is displaceably provided in and extends through two passages 8 of the housing 5 of the pulsator. Both the ends of the rod 7 are connected to a respective plate 9, which are located in a respective closed space outside said passages. In particular, the plates 9 are located in a first chamber 10 and a second chamber 11, respectively, of said spaces. The first chamber 10 and the second chamber 11 are limited by a respective membrane 12 outside which a third chamber 13 and a fourth chamber 14, respectively, of said spaces are provided. The third chamber 13 and the fourth chamber 14 are communicating with each other via a connection conduit 15 comprising a controllable throttling valve 16. The third and the fourth chambers 13, 14 form together with the connection conduit 15 a closed circuit enclosing a dampening fluid, for instance a liquid such as oil or water or a gas such as air. In the embodiment disclosed, the connection conduit 15 is external, i.e. it extends outwardly from said spaces and the third and fourth chambers 13, 14. Of course, it is also possible to let the connection conduit 15 extend through the membrane 12 and the rod 7. In the present case, it also ought to be possible to let the dampening fluid, be air and replace the connection conduit 15 by two passages having a preferably controllable throttling, which connect the respective chamber 13, 14 to the atmosphere.

Moreover, the pulsator comprises a second circuit which is separated from the first circuit and which is arranged to provide said movement back and forth of the valve element 4. The second circuit comprises a first inlet 17*a*, 17*b* which is connected to said vacuum pump and a second inlet 18*a*, 18*b* which is connected to the atmosphere. The second circuit comprises two valve members 19*a* and 19*b* which, via a first outlet conduit 20*a*, are connected to the first chamber 10 and, via a second outlet conduit 20*b*, are connected to the second chamber 11. The valve members 19*a* and 19*b* are designed in such a manner that they may take two stable positions, i.e. they form a bistable element. This means that at a first stable position, the first chamber 10 will be connected to the vacuum pump at the same time as the second chamber 11 is connected to the atmosphere and at a second stable position, which is disclosed in the figure, the first chamber 10 will be connected to the atmosphere at the same time as the second chamber 11 is connected to the vacuum pump.

This function is realized according to the present invention by the provision that the valve members 19*a* and 19*b* comprise two relay valves having a respective two-way valve comprising a valve disc 21*a*, 21*b* which at a first position closes a passage between the first inlet 17*a*, 17*b* and the first and second outlet conduits 20*a*, 20*b*, respectively, at the same time as a passage between the second inlet 18*a*, 18*b* and the respective outlet conduit 20*a*, 20*b* is opened, and at a second position opens a passage between the first inlet 17*a*, 17*b* and the respective outlet conduit 20*a*, 20*b* at the same time as a passage between the second inlet 18*a*, 18*b* and the respective outlet conduit 20*a*, 20*b* is closed. The relay valves 19*a* and 19*b* are provided in such a manner in relation to each other that when one of the valve discs 21*a* takes the first position, the other valve disc 21*b* will forcibly take the second position.

The valve discs 21*a*, 21*b* are via a valve rod 22*a*, 22*b* connected to a respective membrane 23*a*, 23*b*. The membranes 23*a*, 23*b* form a limiting wall of a control chamber 24*a*, 24*b* of each of the relay valves 19*a*, 19*b*. The area of each membrane 23*a*, 23*b* is greater than the area of each of the passages covered by the valve discs 21*a*, 21*b* at the first and second positions. Each control chamber 24*a*, 24*b* is, via a control conduit 25*a*, 25*b* connected to a respective control inlet 26*a*, 26*b*. Each control inlet 26*a*, 26*b* comprises a closing member 27*a*, 27*b* which is designed as an one-way valve and comprises a flexible blade biased against a seat of the control inlet 26*a*, 26*b*. Consequently, the closing members 27*a*, 27*b* are designed in such a manner that they at a rest position close the control inlets 26*a*, 26*b*. The valve element 4 comprises a projecting portion 28 which is arranged, during the movement of the valve element 4 and the rod 7, to engage the closing members 27*a* and 27*b* in such a manner that when the valve element 4 is displaced to the left in the figure it will in the proximity of its end position open the closing member 27*a* and when it is moved to the right in the figure it will in the proximity of its end position open the closing member 27*b*.

Furthermore, the second circuit comprises a first passage 29 which connects the first outlet conduit 20*a* to the control conduit 25*b*, and a second passage 30, which connects the second outlet conduit 20*b* to the control conduit 25*a*. Each of the passages 29 and 30 comprises a throttling 31 and 32, respectively, which result in a delay of the transfer of the control pulse to the second and first relay valves 19*b*, 19*a*, respectively.

The pulsator according to the invention functions in the following way. When the relay valves 19*a* and 19*b* of the second circuit takes the position disclosed in the figure, the second chamber 11 will, via the second outlet conduit 20*b*, be connected to the vacuum pump via the inlet 17*b*. The first chamber 10 will be connected to the atmosphere via the first outlet conduit 20*a*. It means that the pressure difference between the first and the second chambers 10, 11 will force the valve element 4 to the left in the figure. This results in the flowing of the dampening fluid in the third chamber 13 into the fourth chamber 14 via the connection conduit 15. When the valve element 4 approaches its left end position, the portion 28 will engage the closing member 27*a*, which means that the control inlet 26*a* is opened. Thereby, the control chamber 24*a* will be pressurized via the control conduit 25*a*. This pressurization results in a displacement of the membrane 23*a*, due to the area relation between the membrane 23*a* and the passage closed by the valve disc 21*a*, to the right in the figure and in the movement of the valve disc 21*a* to its second position. Moreover, this means that the first chamber 10, via the first inlet conduit 20*a* and the first inlet 17*a*, is connected to the vacuum pump, which means that the force displacing the valve element 4 to the left in the figure ceases. Via the passage 29, the control chamber 24b will be connected to the vacuum pump, which means that the membrane 23b is displaced to the right in the figure and that the valve disc 21b changes over to its second position. This means that the second chamber 11 will be connected to the atmosphere via the second inlet 18b and the second outlet conduit 20b. Consequently, the valve element 4 will now move back to the right in the figure. It is to be noted that the movement of the valve disc 21b to the right is facilitated by the connection of the relay valve 19b to the atmosphere via the passage 30. In a corresponding manner, the direction of movement of the valve element 4 will again be changed when the portion 28 opens the control inlet 26b via the closing member 27b.

The limping of the pulsator according to the invention may easily be adjusted by displacing the position of the valve element 4 and the portion 28 on the rod 7 somewhat to the right or to the left. In the same way the pulsation rate may be adjusted by changing the dampening via the controllable throttling valve 16.

The present invention is not limited to the embodiment disclosed herein but may be varied and modified within the scope of the following claims.

It is to be noted that even though the pulsator disclosed in the first place is intended for a milking machine, the pulsator according to the invention may also be utilized for other purposes where a pulsating pressure level is desired.

What is claimed is:

1. A pulsator comprising:
   a valve element;
   a first chamber;
   a second chamber;
   a first circuit having a first outlet and a second outlet which, by displacement of the valve element, are arranged to be connected alternately to a first source of a first pressure level and a second source of a second pressure level, respectively, the valve element being displaceable by means of a pressure difference between the first and second chambers; and
   a second circuit which is arranged to provide said displacement of the valve element and which comprises a first inlet connected to the first source and a second inlet connected to the second source, the second circuit being designed to take one of a first stable position at which the first inlet is connected to the first chamber at the same time as the second inlet is connected to the second chamber or a second stable position at which the first inlet is connected to the second chamber at the same time as the second inlet is connected to the first chamber,
   wherein the second circuit comprises two valve members having respective first and second control inlets each comprising a closing member that at a rest position closes the control inlet and which are arranged to enable change-over of the second circuit from one of said stable positions to the other of these positions by means of a connection of short duration to the second pressure source by an opening of the closing member of the respective control inlet.

2. A pulsator according to claim 1, wherein said valve element comprises a portion arranged to influence the closing member in such a manner that the control inlet is opened at said change-over.

3. A pulsator according to claim 1, wherein said valve member of the second circuit comprises a first and a second relay valve, the first relay valve being connected to the first chamber via a first outlet conduit and the second relay valve being connected to the second chamber via a second outlet conduit.

4. A pulsator according to claim 3 including a first passage between the first inlet and a respective outlet conduit and a second passage between the second inlet and the respective outlet conduit, wherein each relay valve comprises a two-way valve which at a first position closes the first passage between the first inlet and the respective outlet conduit at the same time as the second passage between the second inlet and the respective outlet conduit is opened and at a second position opens the first passage between the first inlet and the respective outlet conduit at the same time as the second passage between the second inlet and the respective outlet conduit is closed.

5. A pulsator according to claim 4, wherein each relay valve comprises a control chamber which is arranged in such a manner that the pressure level therein determines which of said first and second positions said two-way valve is to take.

6. A pulsator according to claim 3, including a first control conduit connecting the first control inlet to the control chamber of the first relay valve, and a second control conduit connecting the second control inlet to the control chamber of the second relay valve.

7. A pulsator according to claim 6, wherein each control chamber comprises a membrane to which said two-way valve is connected.

8. A pulsator according to claim 7, wherein the first outlet conduit is connected to the second control conduit via a first passage and that the second outlet conduit is connected to the first control conduit via a second passage.

9. A pulsator according to claim 8, characterized in that each of said passages comprises a throttling.

10. A pulsator according to claim 1, wherein the valve element is provided on a displaceable element which at its ends is arranged to be influenced by a first and a second membrane forming a limiting wall of the first and a second chamber, respectively.

11. A pulsator according to claim 10 including a third chamber and a fourth chamber, and wherein the first and second membranes also adjoin the third chamber and the fourth chamber, respectively, which are arranged to dampen the movements of the displaceable valve element.

12. A pulsator according to claim 11 further including a connection conduit, wherein the third and fourth chambers are arranged to enclose a damping medium and are connected to each other via the connection conduit.

13. A pulsator according to claim 12, wherein said connection conduit comprises a controllable throttling for the control of the dampening.

14. A pulsator according to claim 2, wherein said valve member of the second circuit comprises a first and a second relay valve, the first relay valve being connected to the first chamber via a first outlet conduit and the second relay valve being connected to the second chamber via a second outlet conduit.

15. A pulsator according to claim 5, including a first control conduit connecting the first control inlet to the control chamber of the first relay valve, and a second control conduit connecting the second control inlet to the control chamber of the second relay valve.

16. A pulsator according to claim 2, wherein the valve element is provided on a displaceable element which at its ends is arranged to be influenced by a first and a second membrane forming a limiting wall of the first and a second chamber, respectively.

17. A pulsator according to claim 3, wherein the valve element is provided on a displaceable element which at its ends is arranged to be influenced by a first and a second membrane forming a limiting wall of the first and a second chamber, respectively.

18. A pulsator according to claim 4, wherein the valve element is provided on a displaceable element which at its ends is arranged to be influenced by a first and a second membrane forming a limiting wall of the first and a second chamber, respectively.

19. A pulsator according to claim 5, wherein the valve element is provided on a displaceable element which at its ends is arranged to be influenced by a first and a second membrane forming a limiting wall of the first and a second chamber, respectively.

20. A pulsator according to claim 6, wherein the valve element is provided on a displaceable element which at its ends is arranged to be influenced by a first and a second membrane forming a limiting wall of the first and a second chamber, respectively.

\* \* \* \* \*